United States Patent Office.

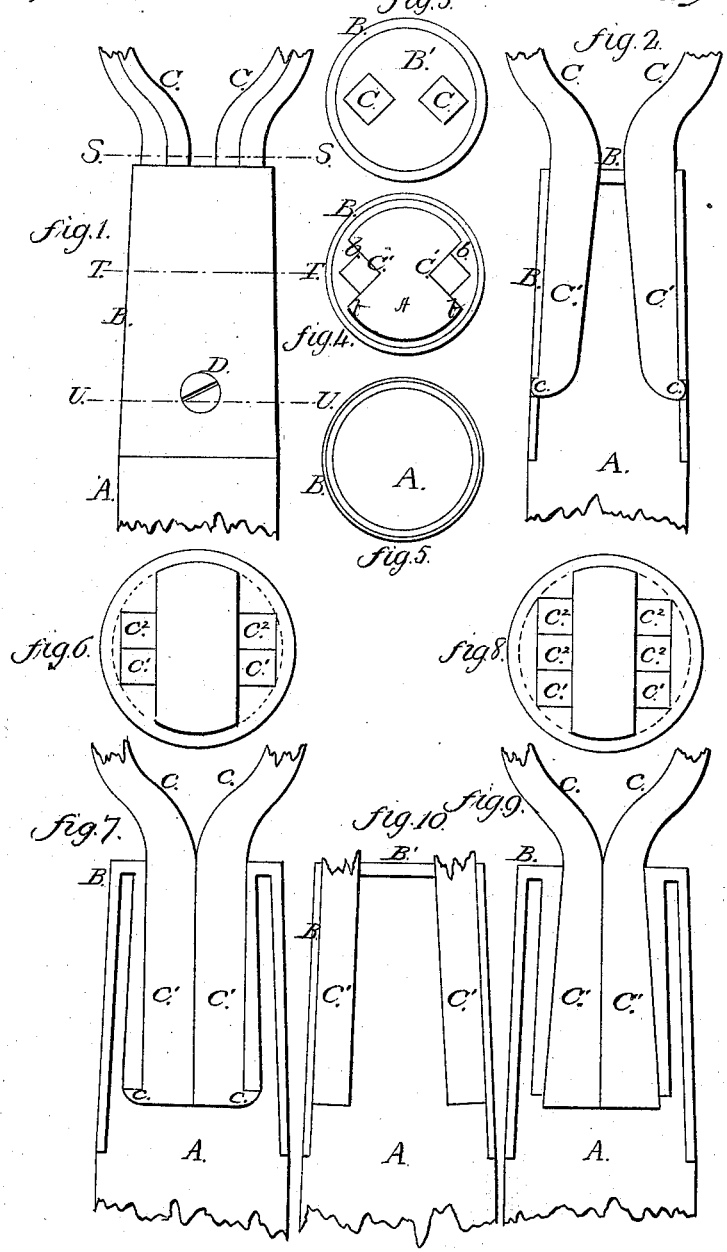

GEORGE B. FLINT, OF SING SING, N. Y., ASSIGNOR TO MONTGOMERY FORK COMPANY, OF NEW YORK CITY.

Letters Patent No. 90,087, dated May 18, 1869.

IMPROVEMENT IN MANURE AND HAY-FORKS.

The Schedule referred to in these Letters Patent and making part of the same.

*To all whom it may concern:*

Be it known that I, GEORGE B. FLINT, of Sing Sing, in the county of Westchester, State of New York, have invented certain new and useful Improvements in the Construction of Forks for Pitching Hay, Manure, and the like; and I do hereby declare that the following is a full and exact description thereof.

My invention relates to that portion where the fork joins the handle.

I will first describe what I consider the best means of carrying out my invention, and will afterward designate the points which I believe to be new.

The accompanying drawings form a part of this specification.

Figure 1 is a side view.
Figure 2 is a central longitudinal section.
Figure 3 is a cross-section on line S S in fig. 1.
Figure 4 is a cross-section on line T T in fig. 1.
Figure 5 is a cross-section on line U U in fig. 1.

These figures show the form of the invention which I prefer for general purposes.

Figures 6 and 7 are sections of a modification, which is useful where more than two tines are required.

Figure 8 is a section of still another modification.

Figures 9 and 10 show still another modification, holding six tines.

The drawings represent the novel parts, with so much of the other parts as is necessary to understand the invention.

Similar letters of reference indicate corresponding parts in all the figures.

Referring to figs. 1 to 5, and describing the fork as being held with the points uppermost, as represented, A is a handle, of ash, or other suitable wood, thoroughly dried.

B is a ferrule, of malleable cast-iron or other suitable material, and

B' is an end piece, which may be formed in one piece with the part B, or may be made separately, and fitted tightly in place by inserting it through the large end of the ferrule, and driving it tightly to its place.

C C are tines, having square tangs C¹, and heads or hooks c at the extreme ends, the functions of which latter will presently appear.

There are, on the interior of the ferrule, ridges, or lugs b, extending longitudinally, and adapted to fit fairly against two of the faces of the tangs C¹.

The hooks or heads c, on the ends of the tangs, spread out below the lugs, the wood being properly recessed, by machinery or otherwise, to allow for the presence of the lugs b, the tangs C¹, and the heads c, and the whole being fitted fairly together, as represented.

The ferrule B is secured upon the handle A by a pin or screw, D.

My fork is very firmly and strongly secured together, and it possesses the advantage over any other construction known to me in the fact, among others, that while the tines are held immovably in place, and supported very strongly by the ferrule, as well as by the wood, the exterior of the ferrule is round, and may be finished in a lathe.

When, in consequence of the breakage of the tines, or other cause, it shall be desirable to release or exchange the tines, it will only be necessary to remove the pin D, and withdraw the handle, after which a slight force will dislodge the tines, and allow them to be repaired or exchanged.

I can turn, if preferred, the hooks c directly outward, and cause them to fit in corresponding recesses in the body of the ferrule.

These recesses may be extended quite through the ferrule, if desired, and the hooks c may extend out flush with or beyond the outer surface of the ferrule, but I do not consider such a provision generally necessary.

If the heads or hooks c are small, I can insert the tangs into the ferrule, tang foremost; but I propose ordinarily to make the hooks or heads c of considerable size, and adapt the tines to thrust through from below, or point foremost. In either case, the tines must be put in place in the ferrule before the handle A is introduced.

Referring to figs. 6 and 7—

$C^1 C^1$ represent the tangs of those tines which form the outer tines of the fork, and $C^2 C^2$ are the tangs of the tines, which are distributed in the space between the former.

This construction is adapted to what are known as dung-forks, and the number of tines may be increased still further, if necessary, by making the tangs flat, as indicated in fig. 8.

The same description given above of figs. 1 to 5, applies equally to this construction. In this, as in the other, the lugs b support the tangs laterally, and form an abutment, or support for the hooks c, to resist any end-pull on the tines.

The middle series of tangs may, if preferred, take hold of the adjacent tangs, instead of taking into recesses in the ferrule B.

I can, if desired, produce the tangs in a tapering form, as indicated in fig. 9, and, in such case, can hold the tangs with considerable firmness without providing any special hooks c, but I prefer ordinarily to provide the hooks c, formed and arranged substantially as represented in the preceding figures, whether the tangs are tapered or not.

Fig. 10 shows the other view of the same construction, and shows clearly how the handle is tapered, and fits between the tines, and presses them outward firmly into their places between the lugs. This construction forms a very strong and substantial device for manure-forks.

It will be observed that the figure shows the bevelled tines being pressed outward, filling up firmly between the lugs when to their places, preventing their being forced outward from their places.

Having now fully described my invention,

What I claim as new, and desire to secure by Letters Patent, is as follows:

I claim supporting the tangs within a round ferrule by the means of internal lugs $b$, with the aid of hooks $c$, or their equivalents, substantially as and for the purposes herein set forth.

GEORGE B. FLINT.

Witnesses:
C. C. LIVINGS,
W. E. RUTTAN.